United States Patent [19]
Jennings, Jr.

[11] Patent Number: 5,411,093
[45] Date of Patent: May 2, 1995

[54] METHOD OF ENHANCING STIMULATION LOAD FLUID RECOVERY

[75] Inventor: Alfred R. Jennings, Jr., Plano, Tex.

[73] Assignee: Mobil Oil Corporation, Fairfax, Va.

[21] Appl. No.: 164,860

[22] Filed: Dec. 10, 1993

[51] Int. Cl.$^6$ .............................................. E21B 43/26
[52] U.S. Cl. .................................... 166/300; 166/308
[58] Field of Search ...................... 166/280, 300, 308; 252/8.551

[56] References Cited

U.S. PATENT DOCUMENTS

| | | | |
|---|---|---|---|
| 3,363,691 | 1/1968 | Gomory | 166/280 |
| 4,738,897 | 4/1988 | McDougall et al. | 428/402 |
| 4,832,123 | 5/1989 | Abou-Sayed et al. | 166/281 |
| 4,844,163 | 7/1989 | Hazlett et al. | 166/300 X |
| 4,848,467 | 7/1989 | Cantu et al. | 166/308 X |
| 5,102,558 | 4/1992 | McDougall et al. | 166/308 X |
| 5,217,074 | 6/1993 | McDougall et al. | 166/300 |

*Primary Examiner*—George A. Suchfield
*Attorney, Agent, or Firm*—Alexander J. McKillop; George W. Hager; Charles A. Malone

[57] ABSTRACT

A method for increasing the efficiency by which fracture fluids are produced back from a hydrocarbonaceous fluid bearing formation. To remove said fracture fluid, agglomerated particles or granules containing a chemical blowing agent are placed into the formation. After placement of the agglomerated particles and granules containing the blowing agent and fracturing the formation, the blowing agent decomposes thereby providing a driving force for fluid load removal from the formation matrix. Increased porosity enhances communication between the formation and the fracture, thus increasing the efficiency of fracture fluid production. Gas liberation within the matrix establishes communication pathways for subsequently removing hydrocarbonaceous fluids by displacing load fluids into the fracture and the well.

15 Claims, No Drawings

METHOD OF ENHANCING STIMULATION LOAD FLUID RECOVERY

FIELD OF THE INVENTION

This invention relates to methods for removing residual drive or treating fluids from a subterranean formation.

BACKGROUND OF THE INVENTION

Once the natural driving force has been depleted oil or hydrocarbonaceous fluids must be removed from a formation via enhanced oil recovery methods. Some of these enhanced oil recovery methods where fracturing is employed utilize foams, gels, water, or other fluids which can also damage the formation and impede the recovery of hydrocarbonaceous fluids. Indeed, some of these fluids (fracture fluid load) can cause permanent damage to a formation. Once fracture fluid has served its purpose, it is necessary to remove it to continue producing hydrocarbonaceous fluids from the formation.

Methods are available to the oil producing industry for removing or lifting these spent load fluids from the reservoir. In one of these methods, stimulation fluids using foam (nitrogen and water, nitrogen and hydrocarbons, carbon dioxide and water, and carbon dioxide and hydrocarbons) have also been developed by service companies which provide built-in gas assist. Also nitrogen or carbon dioxide can be added as a gas "on the fly" during stimulation treatments.

Drawbacks to the use of gas assist include: economics (addition of gases adds to the expense of well stimulation) equipment (special equipment is required to handle gas on the surface prior to the treatment for pumping during the treatment); availability (remote areas where gas sources and handling equipment are not available); and safety (pumping at high pressures can be dangerous).

Therefore, what is needed is a method that overcomes the economy, equipment, availability, equipment, and safety drawbacks associated with prior art gas assist methods for removing residue drive fluids, spent fracturing fluids, and treating fluids from a reservoir.

SUMMARY OF THE INVENTION

This invention is directed to a method for removing a fluid load from a formation following a fluid stimulation treatment to increase hydrocarbonaceous fluid production. To remove said fluid load, agglomerated particles hereinafter referred to as granules containing chemical blowing agents are placed into said formation in an amount sufficient to create gas at a rate and volume sufficient upon decomposition thereof to move said fracturing fluid through said formation. After placement of agglomerated particles or granules containing said chemical blowing agent into the formation, the formation is shut-in. Thereafter the chemical blowing agent decomposes by conditions existing in the formation. Upon decomposition the agglomerated particles or granules with the chemical blowing agent therein liberates gas at a rate and volume sufficient to energize said fluid load thereby causing a substantial increase in the speed of fracture fluid removal from said formation.

It is therefore an object of this invention to use agglomerated particles or granules containing chemical blowing agents to generate a gas in-situ to facilitate the removal of a fracture fluid load from the formation.

It is another object of this invention to efficiently remove a fracture fluid load from a formation to minimize formation damage by using agglomerated particles or granules containing a chemical blowing agent therein.

It is yet another object of this invention to reduce the cost and time for removal of a fracture fluid load from a formation.

It is another object of this invention to provide an effective method for removing and reclaiming materials used in a formation fluid drive.

It is a still yet a further object of this invention to remove a fracture fluid load from a hydrocarbonaceous fluid reservoir via agglomerated particles or granules containing a chemical blowing agent therein.

It is an even still further object of this invention to provide for agglomerated particles or granules containing chemical blowing agents therein so as to release gases therefrom within a reasonable time period thereby avoiding long shut-in times.

BRIEF DESCRIPTION OF THE PREFERRED EMBODIMENTS

In the practice of this invention, agglomerated particles or granules containing a chemical blowing agent therein are placed into a formation during a fracturing operation. These agglomerated particles or granules containing the chemical blowing agent is placed into the formation in a fracturing fluid whereupon it enters the formation via a perforated well. Typical fracturing fluids include water-based brine fluids containing a water-soluble polymer such as hydroxypropyl guar crosslinked with a transition metal salt. Other polymers used to viscosify aqueous fracturing fluids are guar gum, hydroxethyl cellulose, polyacrylamide, gum karaya and the like. In addition, fracturing fluids may also be viscous oils or oil-based emulsions such as crosslinked gel forms or liquid gel forms. Viscosification of these fluids is accomplished by addition of surfactants, aluminum alkyl phosphates, asphalts, fatty-acid soaps, other emulsions, and foam stabilizing agents and the like.

Upon entering the formation, the agglomerated particles or granules containing the chemical blowing agent are directed into the fracture containing the proppant and partially into the matrix of the formation where a fracture fluid has leaked-off following a fracturing operation. The chemical blowing agent can be selected to decompose because of the formation temperature or a pH change. Once decomposition has occurred, gas is liberated from the chemical blowing agent. Gas liberation within the reservoir forces the fracture fluid from the formation matrix into the fracture. After fracture fluid has been removed, hydrocarbonaceuous fluids can be produced from the formation more easily. This method can be used to remove fracture fluid from a formation from which hydrocarbonaceous liquids are produced. This method is particularly beneficial in a formation from which a hydrocarbonaceous gas is produced. Use of this method in a gas containing formation or reservoir facilitates gas production. The use of aqueous solutions of chemical blowing agents to remove a fracture fluid from a formation is disclosed in U.S. Pat. No. 4,832,123 which issued to Abou-Sayed et al. on May 23, 1989. This patent is hereby incorporated by reference herein.

The amount of chemical blowing agent utilized will of course depend upon factors including the agent employed, environment of the formation, composition of the formation, and the area of the formation desired to be treated. Although these fractures will dictate the amount of blowing agents utilized, it is generally anticipated that the blowing agent utilized will vary from about 0.50 to about 5.0% by weight.

One chemical blowing agent that can be used herein is azodicarbonamide. Since this compound is available in powder form with average particle size in the micron range, it can be easily admix with the agglomerated particles or granules. The amount of azodicarbonamide should be sufficient to create the volume of gas required to create an open-cell structure. In order to assist in making the open-cell structure, a surfactant is incorporated into the fracturing fluid. One such surfactant is alkyl naphthalene sulfonate, which can be purchased from GAL Corp., located in New York, and sold as the "NEKAL" surfactant series.

Another chemical blowing agent formulation which can be utilized herein comprises dintrosopentamethylenetetramine (DNPT), blends of sodium hydrogen carbonate and nitrogen releasing agents such as p-toluene sulfonyl hydrazide, and p,p'-oxybis (benzenesulfonyl hydrazide). Other chemical blowing agents which can be utilized include azodicarbonamide and the sodium salt of azodicarboxylic acid. In addition to the sodium salt, a potassium salt of azodicarboxylic acid can be used which upon decomposition release nitrogen and carbon dioxide gases.

The chemical blowing agent may be used per se in the agglomeration process to form the granules or, in other embodiments, may be deposited on or in a particle which functions as a core, seed or carrier for the chemical blowing agent in the agglomeration process. For example the chemical blowing agent may be sprayed as a solution or in liquid form onto small, finely divided seed particles to form a coating on or in the seed particles. By way of another example, the chemical blowing agent can also be used in a carrier particle with a solid polymeric matrix as described in U.S. Pat. No. 4,738,897, or p,p'-oxybis or in a porous solid such as diatomaceous earth are coated on an inert core substrate such as urea. This patent is hereby incorporated by reference herein.

In another embodiment of this invention, the agglomerated granules containing the chemical blowing agent, with or without a seed, core or carrier may be overcoated or encapsulated with a thermoplastic polymer material. The preferred coating or capsulation process is described in U.S. Pat. No. 5,102,558 which is hereby incorporated by reference herein. A method for making agglomerated particles or granules wherein a gel breaker is utilized, is disclosed in U.S. Pat. No. 5,217,074 which issued to McDougall, et al. on Jun. 8, 1993. This patent is hereby incorporated by reference herein.

In order to form the agglomerated particles or granules, inorganic inert binders are utilized. The inorganic powdered binder functions to bind the particulate chemical blowing agent compound together and increase the strength and integrity of the granules. The powdered binder also provides a microporous matrix for conducting the carrier liquid (e.g., water) by capillary attraction to the interior of the granule thereby enabling the fluid to contact the chemical blowing agent therein. Therefore, dissolution of the chemical blowing agent is by contacting the granule surface and/or interior with the carrier liquid. Because of its availability and effectiveness in granulation, clay is the preferred binder for use herein. The term "powdered" or "powder" means tiny particles having an average particle size of 10 to 50 microns, preferably 20 to 40 microns. Clays "bentonite and attupulgate" are easily wet .by water and are capable of being granulated with high levels of breaker compounds to form relatively strong granules of the proper size for use herein. When utilized in the granules, clay particles develop agglomeration forces by surface tension of the water present, adhesion forces, and electrostatic forces. Other inorganic binders include sodium silicate, colloidal alumina, colloidal silica, infusorial earth and the like.

In addition to the principal chemical blowing agent, other particulate additives which improve the strength and function of the granule or aids in the processing may be used. Talc, which is magnesium silicate hydrate, functions as a binder and as a solid lubricant in the granulation process.

Infusorial earth (e.g., diatomaceous earth) appears to improve the strength of the granules. Infusorial earth is a powder which is capable of holding four times its weight in water. Although it is not fully understood why the presence of infusorial earth improves the performance of the granules, it is believed that the high uptake of water ties up and distributes the water throughout the granule, thereby stabilizing the granules.

In order to facilitate processing of the mixture of particles included in the granules, a small amount of an organic binder is added. The organic binder serves as a processing aid in the granulation process and as a binder in the final granule. Because of hazards involved in the granulation process, it is necessary that the organic material selected as a binder/processing aid be substantially non-oxidizable. The non-oxidizable character also increases the shelf life of the granules. The preferred non-oxidizable materials comprise polyvinyl pyrrolidone (PVP), and polyvinyl alcohol. Methods for manufacturing the granules are disclosed in U.S. Pat. No. 5,217,074 supra.

Propping agents can also be used when hydraulically fracturing the formation so as to retain the integrity of the fractures. Sand, sintered ceramics, resin coated sand or combinations thereof can be utilized as the propping agent. As is known to those skilled in the art the concentration of the propping agent depends its the size and shape.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed:

1. A method for removing fracture fluid from a formation following a fracture treatment comprising:
   a) injecting granules or agglomerated particles containing a chemical blowing agent into a formation in an amount sufficient upon decomposition of said agent to create gas at a rate and volume sufficient to remove a fracture fluid from said formation where said chemical blowing agent is a member selected from the group consisting of dintrosopentamethylenetetramine, sodium hydrogen carbonate and p-toluene sulfonyl hydrazide, azodicarbonamide, an alkali metal salt of azodicarboxylic acid and p,p'-oxybis(benzenenesulfonyl hydrazide); and b) causing said chemical blowing agent to decompose so that gas is liberated in an amount sufficient to remove said fracture fluid from the formation's matrix into a fracture thereby enhancing production of said fluid from said formation.

2. The method as recited in claim 1 where in step (b) said fracture fluid comprises a gel, a foam, or water.

3. The method as recited in claim 1 where a hydrocarbonaceous fluid is produced from the formation after step b).

4. The method as recited in claim 1 where said chemical blowing agent is a formulation of sodium hydrogen carbonate and p-toluene sulfonyl hydrazide which decomposes to release nitrogen and carbon dioxide gases.

5. The method as recited in claim 1 where the alkali metal salt of azodicarboxylic acid is a sodium or potassium salt of azodicarboxylic acid which upon decomposition liberates nitrogen and carbon dioxide gases.

6. The method as recited in claim 1 where the fracture fluid is recovered and separated from hydrocarbonaceous fluids produced from said formation.

7. The method as recited in claim 1 where this method is conducted in a gas containing formation or reservoir which facilitates gas production.

8. A method for enhancing removal of fracture fluid from a formation or reservoir comprising;

a) placing into a fracturing fluid agglomerated particles or granules containing a chemical blowing agent in an amount sufficient upon decomposition of said agent, to create gas sufficient to remove a fracture fluid from said formation;

b) fracturing said formation and causing said chemical blowing agent to decompose after completion of said fracturing; and c) completing said fracturing and decomposing said chemical blowing agent thereby liberating gas in an amount sufficient to remove fracture fluid from the formation's matrix into a fracture which enhances production of fluid load from said formation.

9. The method as recited in claim 8 where in step b) said fluid comprises a gel, a foam, or water.

10. The method as recited in claim 8 where this method is conducted in a gas containing formation or reservoir which facilitates gas production.

11. The method as recited in claim 8 where said chemical blowing agent is a formulation of sodium hydrogen carbonate and p-toluene sulfonyl hydrazide which decomposes to release nitrogen and carbon dioxide gases.

12. The method as recited in claim 8 where a sodium or potassium salt of azodicarboxylic acid comprises the chemical blowing agent which upon decomposition liberates nitrogen and carbon dioxide gases.

13. The method as recited in claim 8 where the chemical blowing agent is selected from a member of the group consisting of dinitrosopentamethylenetetramine, sodium hydrogen carbonate and p-toluene sulfonyl hydrazide, azodicarbonamide, an alkali metal salt of azodicarboxylic acid, and p,p'-oxybis (benzenesulfonyl hydrazide).

14. The method as recited in claim 8 where a hydrocarbonaceous fluid is produced from the formation after step c).

15. The method as recited in claim 8 where the fracture fluid is recovered and separated from hydrocarbonacous fluids produced from said formation.

* * * * *